April 8, 1930.  H. KANNER  1,753,519
WHEEL AND TIRE COVER
Filed Aug. 15, 1928   2 Sheets-Sheet 1
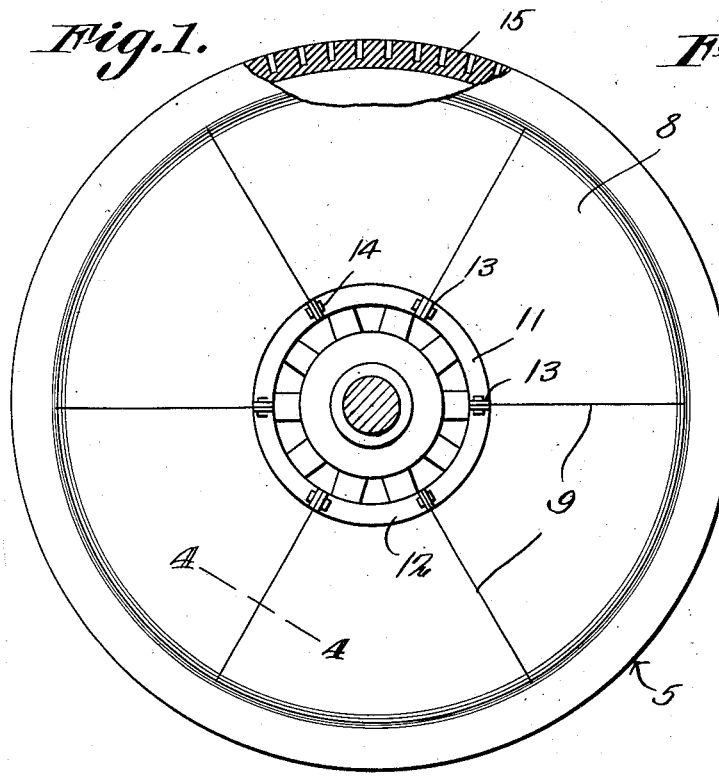
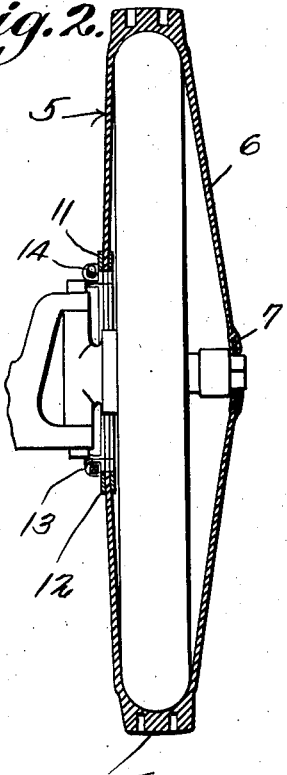
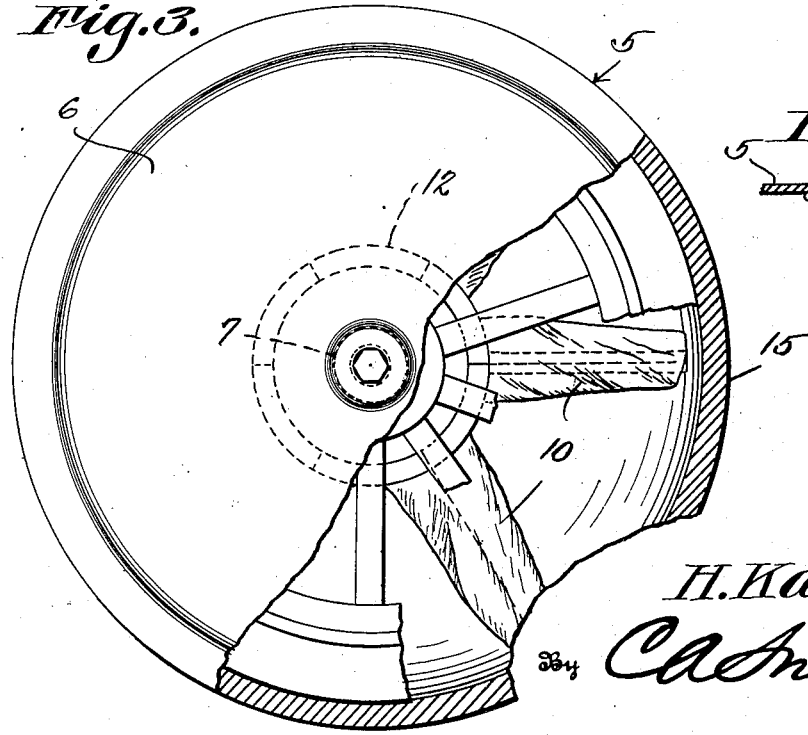
Inventor
H. Kanner
By C.A.Snow&Co.
Attorneys.

April 8, 1930. H. KANNER 1,753,519
WHEEL AND TIRE COVER
Filed Aug. 15, 1928 2 Sheets-Sheet 2
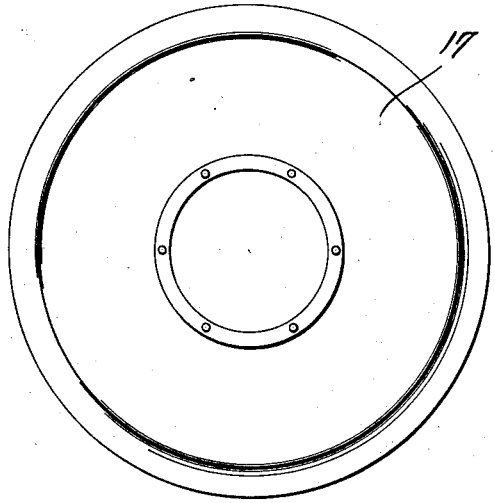
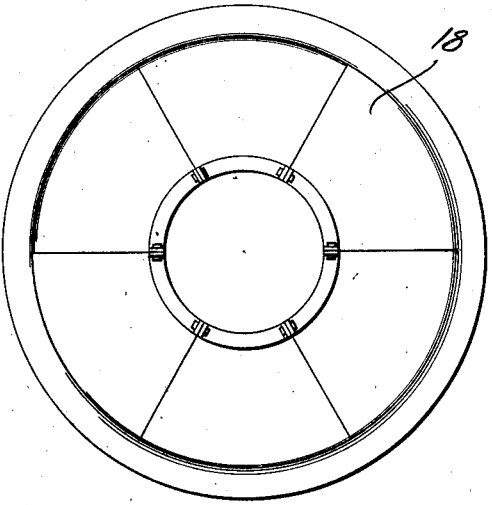
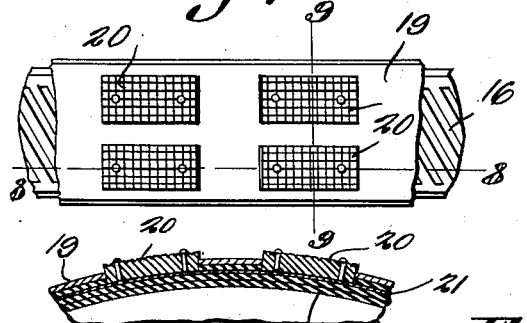
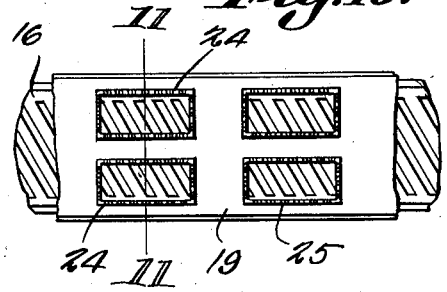
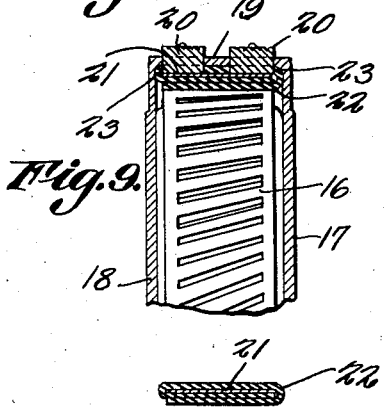
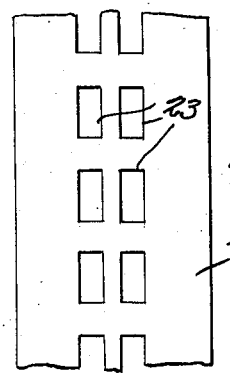
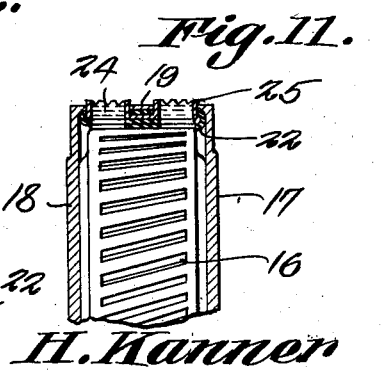
H. Kanner
Inventor
By C.A. Snow & Co.
Attorneys.

Patented Apr. 8, 1930

1,753,519

UNITED STATES PATENT OFFICE

HENRY KANNER, OF SAN ANTONIO, TEXAS

WHEEL AND TIRE COVER

Application filed August 15, 1928. Serial No. 299,820.

This invention relates to a device designed as a protector and cover for the usual pneumatic tire, the primary object of the invention being to provide a cover constructed of rubber to completely house a pneumatic tire and wheel on which the same is mounted to exclude the elements which tend to deteriorate tires.

An important object of the invention is to provide means whereby the cover or protector may be secured to the wheel on which the tire to be protected is mounted, in such a way that the cover or protector will be securely held in position against movement with respect to the tire.

A further object of the invention is to provide a cover of this character having a substantially thick tread section so that the wear usually directed to the tread of the tire, will be directed to the tread of the cover, to the end that when the tread of the cover is worn out, the cover may be readily replaced by another cover, thereby greatly increasing the life of the usual pneumatic tire to which the device is secured.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view illustrating a cover constructed in accordance with the invention as positioned on a tire and wheel, the inner side of the cover being shown in this figure.

Figure 2 is a vertical sectional view through the cover as positioned on a wheel.

Figure 3 is an elevational view illustrating the outer side of the cover, a portion thereof being broken away.

Figure 4 is a sectional view taken on line 4—4 of Figure 1.

Figure 5 is an elevational view of the outer side of the casing.

Figure 6 is an elevational view illustrating the inner side of a modified casing.

Figure 7 is a fragmental plan view showing a modified form of housing as mounted on a wheel.

Figure 8 is a sectional view taken on line 8—8 of Figure 7.

Figure 9 is a sectional view taken on line 9—9 of Figure 7.

Figure 10 is a plan view of a modified form of the invention.

Figure 11 is a sectional view taken on line 11—11 of Figure 10.

Figure 12 is a fragmental elevational view of the protecting strip forming a part of the invention.

Figure 13 is a sectional view through the protecting strip when in its folded condition.

Referring to the drawings in detail, the device includes a circular casing indicated generally by the numeral 5 the casing being formed of rubber and of a diameter to fit over a wheel and tire supported thereon, to closely engage the tire in such a way as to insure against movement of the casing with respect to the tire.

As shown, the outer side of the casing which is indicated by the reference character 6, is formed with a central opening to accommodate the hub cap of the wheel, as shown by Figure 2, the central opening being reinforced by means of the metallic ring member 7 that is shown as embedded in the rubber material of which the casing is formed, thereby insuring against tearing the cover or casing when unusual strains are directed to the sides of the casing.

The inner side of the casing embodies a plurality of sections such as indicated at 8, the sections being formed by slitting the inner surface of the casing as at 9, the slits extending to points adjacent to the tread of the cover or casing.

Secured to the sections and arranged in proximity to the adjacent edges thereof, are flexible strips 10 formed of canvas or rubber, the strips being constructed so that they will fold in a manner as shown by Figure 4, when the side edges of the sections are brought together.

Secured to the inner end of each section is a curved metallic member 11 that forms a section of the securing ring 12, each member 11 being shown as provided with upstanding ears 13 at its ends. It is of course obvious that this ring 12 is of a diameter to clear the mechanism of the wheel adjacent thereto, but at the same time, exclude foreign matter from the interior of the casing.

When the device is positioned over a tire, the ears 13 of the adjacent sections are brought together as shown by Figure 1, where they are secured by means of the bolts 14, thereby providing a rigid structure for securing the inner ends of the sections together. The tread which is indicated by the numeral 15 is substantially thick to withstand the road strains to which the tread of the usual pneumatic tire is subjected.

It will further be obvious that when a cover or casing of this character has been positioned over a wheel, all foreign matter such as mud, gravel or the like which may puncture the tire, are excluded, to the end that the life of the tire will be greatly increased.

In the form of the invention as illustrated by Sheet 2 of the drawings, the casing is especially adapted for use on the rear wheels of a motor vehicle, the construction being slightly different from the construction of the casing used in connection with the front wheels of the motor vehicle and is so constructed that it will possess certain traction qualities necessary for the drive wheels of a vehicle.

The reference character 16 designates the tread of a tire over which the circular casing is positioned, the circular casing embodying outer and inner side members 17 and 18 respectively and a tread section 19, the tread section being formed with rectangular openings through which the tread blocks 20 extend, the tread blocks being riveted to the supporting band 21, and as shown are of thicknesses to extend appreciable distances above the tread portion 19 of the casing.

This band 21 is held within the casing 22 which is substantially wide and formed with rectangular openings 23 through which the blocks 20 extend, the casing 22 being folded around the band 21 in a manner as shown by Figure 9. Thus it will be seen that due to this construction all danger of the band cutting the casing, is eliminated.

Another form of tread is illustrated by Figures 10 and 11 of the drawings, and in this form of the invention the circular casing is formed with rectangular openings through which the tread members 24 pass, the tread members being formed by stamping portions of the band outwardly to define flanges 25, the outer edges of the flanges being notched to bite into the surface over which the wheel is moving.

A casing identical with that shown by Figure 12, is used in this form of the invention and is wrapped around the band from which the tread members 25 are stamped. Owing to the fact that the tread sections are open, it will be obvious that air may enter between the circular casing and wheel over which the circular casing is positioned, to cool the tire and reduce wear to the minimum.

I claim:

A cover for motor vehicle tires, including a body portion formed of elastic material and having an opening to accommodate the hub cap of the wheel over which the cover is positioned, said cover including an inner side having an enlarged central opening, said inner side having slits extending to the central opening, metallic sections having upstanding ends, secured adjacent to the central opening, the ends of the metallic sections having openings to receive bolts to secure the metallic sections together, and said cover having a tread portion.

In testimony that I claim the foregoing as my own, I have hereto affixed my signature.

HENRY KANNER.